United States Patent [19]

Hanaoka

[11] Patent Number: 4,636,259

[45] Date of Patent: Jan. 13, 1987

[54] SOYBEAN PROTEIN FILM

[75] Inventor: Joichi Hanaoka, Kawanishi, Japan

[73] Assignee: Yoshihara Oil Mill, Ltd., Osaka, Japan

[21] Appl. No.: 682,761

[22] Filed: Dec. 17, 1984

[30] Foreign Application Priority Data

Dec. 17, 1983 [JP] Japan ............................... 58-238285

[51] Int. Cl.[4] .......................... B32B 7/02; C08L 89/00
[52] U.S. Cl. .................................. 106/122; 106/154.1; 428/218; 428/220
[58] Field of Search ................. 106/125, 154; 428/220, 428/218

[56] References Cited

U.S. PATENT DOCUMENTS 3,424,648  1/1969  Young .................................. 428/473
3,429,768  2/1969  Young .................................. 106/122

*Primary Examiner*—Theodore Morris
*Attorney, Agent, or Firm*—Wenderoth, Lind & Ponack

[57] ABSTRACT

This invention relates to a soybean protein film which contain air bubbles in film and is made from soybean protein solution or suspension which contains air bubbles, and is dried by heating.

The density of said protein film thus manufactured is 0.1–0.8 g/cm$^3$.

Said soybean protein film containing air bubbles has better adhesive properties between said soybean protein film each other or with other food.

Said soybean protein film containing air bubbles gives better toothfeeling, better solubility in the mouth and easy to eat and easy to use, and so can be used wide range of foods.

5 Claims, No Drawings

SOYBEAN PROTEIN FILM

BACKGROUND OF THE INVENTION AND PRIOR ART

This invention is a soybean protein film which contains small air bubbles and said soybean protein solution or suspension which contain air bubbles on the flat surface and is dried by heating.

The said soybean protein film has 0.1–0.8 g/cm³ density and better adhesive property and better taste.

There has been YUBA which is one of the traditional foods in Japan, and this YUBA is manufactured by gathering the protein film spreaded on the surface of protein milk and drying intact.

Dryed YUBA presents a pale yellow and lustrous film like state and is crisp and smooth in surface.

It is necessary to wet a dryed YUBA by water once when dryed YUBA is used for rolling up or wrapping up a cooking material.

Wetted raw YUBA is a soybean protein itself, and is formed on the surface of heated soybean milk.

It is very difficult to preserve a wetted raw YUBA in a state of perfection, as it is roted and so a raw YUBA is only sold directly by the manufacturers or the shops well equiped with cold strage equipment.

YUBA type elastic film is manufactured when wetting agents such as Solbitol and/or Glycerol are added to a Soybean protein solution or suspension and after said solution or suspension is applied to the flat surface, it is dried by heating.

Yuba type elastic film thus manufactured is refered to simply as Yuba type film hereinafter.

This Yuba type film has a better elastic property even if it is dryed, because it contains wetting agents.

Although Yuba type film can roll up or wrap up cooking materials, but it has a fatal defect of no adhesive property.

Furthermore, usual dried Yuba, wetted raw Yuba and Yuba type film have many following defects:

(a) It is necessary for dried Yuba to moisten it with water again, when it is used for cooking materials and this operation is very troublesome.

(b) Dried Yuba once moistened or wetted raw Yuba is not fitted for foods which are requested to avoid humidity, because these have high moisture content.

(c) Dried Yuba film once moistened and wetted raw Yuba film have very bad adhesion property and liable to peel off, for example, for use with boiled rice.

Moreover these films are not rolled up or wrapped up to-gether due to no adhesive property each other.

(d) Although Yuba type film can be rolled up or wrapped up cooking material in dry state but said film is not fitted to use for cooking material due to the defect which have no adhesive properties as described (c) above.

(e) Dried Yuba film, wetted raw Yuba film and Yuba type film are all formed into films due to the binding energy of soybean protein each other, and so these films are difficult to solve in water and bad toothfeeling in mouth due to a feeling of physical disorder and said dried films are felt rough to the tongue and have bad toothfeeling in mouth and especially it is very troublesome due to the coming out of the contents, when the contents are rolled up or wrapped up the soft flowing material for example ice cream, jam or jelly etc..

DETAILED DESCRIPTION OF THE INVENTION

This invention is quite different from usual dried Yuba, wetted raw Yuba or Yuba type film which has many defects as described above. It is a object of this invention to provide a soybean protein film containing air bubbles useful to very wide range of foods, because soybean protein film of my invention has adhesive property between said soybean protein film each other and with other food and has good toothfeeling, soluble in mouth and has no bad feeling of physical disorder. Besides the uses of ordinary Yuba, the soybean protein film containing air bubbles of my invention has many desirable uses such as a wrapping film of rolled Sushi made from rice, rice ball, boiled fish paste, roll boiled fish paste. Sweet jelly of beans, bun with a bean-jam filling, sponge cake and fluid foods such as ice cream, custard-cream, jam or jelly.

Inventor had studied many years about soybean protein film and reached to a conclusion that soybean protein film containing air bubbles of superior quality is manufactured by applying or flowing out the soybean protein solution or suspension containing air bubbles to the flat surface and dried at room temperature intact or by heating at 30° C.–120° C. and thus manufactured soybean protein film containing air bubbles has good toothfeeling, good solubility in mouth and no bad feeling of physical disorder and moreover has better adhesive property.

Soybean protein film containing air bubbles of my invention which has superior tooth feeling is composed of soybean protein as main ingredient which is separated and purified from defatted soybean powder and if necessary, wetting agents such as Solubitol and/or Glycerol are added to said soybean protein and a solution or suspension of soybean protein is made by adding water and is added air bubbles by mechanical stirring and thus manufactured protein solution containing air bubbles is applied or poured on the flat surface and is dried by heating, if necessary by stretching.

Soybean protein isolated from defatted soybean powder contains over 90 weight % protein ordinary and so-called concentrated soybean protein contains over 70 weight % protein, and soybean protein film containing air bubbles of my invention can be manufactured by using isolated or concentrated protein as a starting material.

A method of making air bubbles hold in the soybean protein solution or suspension is suitable to use bubble-making mixer and the extent of the amount of bubbles in the protein solution or suspension is not limitted, but from protein solution which gives a film density of 0.2–0.8 g/cm³, are manufactured a strengthened film and a film which has good toothfeeling.

The manufactured film which has a density of the protein film below 0.2 g/cm³ is inferior to its strength and has no practical use, and the density of the protein film over 0.8 g/cm³ is inferior to toothfeeling and both protein films can not accomplish the object of present invention.

Stability of air bubbles after bubbling and the thickness of the protein film after drying are influenced by the protein concentration of protein solution or suspension and suitable protein concentrtion of protein solution or suspension is 5–20 weight %, and the thickness of protein film has 0.02–1 mm prefarably 0.05–0.4 mm for rolling up or wrapping up foods by said films.

Soybean protein film of my invention after drying contains fine air bubbles and the density of the protein film of 0.1–0.8 g/cm$^3$ is suitable for rolling up or wrapping up the food and smaller the density, has the better toothfeeling and better solubility and reduced feeling of physical disorder in mouth when the sheet has equal thickness.

But stengh of film becomes smaller in case of when the density of film is below 0.1 g/cm$^3$ and film is teared and not practical.

Sheeted films which are stretched during drying by heating, have a large film strength and a merit difficult to tear.

Contrary, although the film is increased in strength and is not teared or broken, but in case of when density of film exceedes 0.8 g/cm$^3$, toothfeeling or solubility of the film in the mouth becomes deteriorated and increases feeling of physical disorder.

Moreover, Soybean protein film containing air bubbles of my invention has a merit of better adhesion property with foods or cooking materials in addition to the better toothfeeling.

And it is suitable to use as a wrapping film or rolled Sushi made of rice, rice ball and other wrapped foods.

Soybean protein film containing air bubbles of my invention which has better adhesion property and toothfeeling has quite different merits from the usual Yuba, wetted raw Yuba or Yuba type film in points of easy to eat and use, and so my invention had greatly contributed to improve the various eating habits of a human being and furthermore, it was found Soybean protein product which is not existed formerly is obtained by giving various color, incense and taste in addition to the color, tast and incense of the original soybean protein film.

EXAMPLE 1

Soybean protein product containing 90% protein (N.S.I.=Nitrogen Solubility Index, 90) 60 g and water are mixed uniformly and then are devided into 2 parts. One part is deaired thoroughly by deaerator and is applied to the Tetron (Commercial name of Cloth made from polyester fiber) sheet 0.3 mm thick.

The product is removed from Tetron sheet after drying for 7 minutes at 110° C. in the dryer.

The product of film is called film A.

The other part of solution is bubbled 20 minutes by bubble-making mixer (Commercial name KEN-MIX made of AIKOSHA Co., Ltd., Japan) and then is obtained the product film B by the same method.

Density of the solution deaired is 1.00 g/cm$^3$.
Density of the solution bubbled is 0.54 g/cm$^3$.
Properties of film A and B are shown in Table I:

TABLE I

| Proper- ties Film | Film A (Ordinary Yuba) | Film B (Protein film made from my invention) |
|---|---|---|
| Thickness (mm) | 0.10 | 0.13 |
| Density (g/cm$^3$) | 1.01 | 0.35 |
| Toothfeeling | Not soluble in mouth, bad toothfeeling | Soon soluble in mouth, soft and good toothfeeling |
| Adhesion | no adhesion | adhesive greatly |

EXAMPLE 2

Soybean protein product (N.S.I. 80) 90 g, Solubitol 20 g, Glycerol 15 g and water 450 g are mixed uniformly and then are devided into 2 parts.

One part of solution is deaired throughly by deaerator and the other part of solution is bubbled 15 minutes by bubble-making mixer similar to the method of Example 1.

Both solutions are applied to the Tetron sheet and dryed 20 minutes at 100° C. Density of deaired solution is 1.07 g/cm$^3$ and density of bubbled solution is 0.71 g/cm$^3$. The obtained film, throughly deaired is named film C, and bubbled film are named film D, rolled Sushi and custard-cream are made by using film C and film D.

Properties of film C and D are shown in Table II.

TABLE II

| Proper- ties of film | Films C (Ordinary Yuba) | Film D Protein film made from my invention |
|---|---|---|
| Thickness (mm) | 0.20 | 0.28 |
| Density (g/cm$^3$) | 1.02 | 0.46 |
| Elasticity | Film is easily broken and is not dissolve in mouth | Film is bended easily |
| Toothfeeling of film | Film is not dissolved in mouth | Film becomes soft in mouth and good touch |
| Properties of rolled Sushi | Boiled rice and film do not adhere and after rooling up the boiled rice, rice and film are separable easily | Boiled rice and film adhere good, and boiled rice is rolled up easily and after rolling up, rice and film are not separable |
| Toothfeeling of rolled Sushi | Rice and film of rolled Sushi are separable each other, therefore these give a feeling of physical disorder. As toothfeeling is wrong, rolled Sushi is broken to eat. | As rice and films of rolled Sushi are combined together and they absorb water soon, they do not give a man feeling of physical disorder, and rolled Sushi is not crushed to eat. |
| Custard-Cream which is rolled up by film | As toothfeeling of the film is wrong, and cream is scattered out of the wrapped cream when eating | As toothfeeling of the film is good, and cream does not scattered out of the wrapped cream when eating |

What is claimed is as follows:

1. A soybean protein film useful in preparing food products, wherein said film contains air bubbles, has a thickness of 0.05–1 mm and a density of 0.1–0.8 g/cm$^3$, and is prepared by sheeting a solution or suspension containing air bubbles and 5–20 weight % of soybean protein, and drying the resultant sheet at from room temperature to 120° C.

2. The soybean protein film as claimed in claim 1, wherein said soybean protein is isolated or concentrated from defatted soybean powder, air bubbles are introduced into said solution or suspension, and said solution or suspension containing said air bubbles is applied onto a flat surface and then heated intact on said flat surface.

3. The soybean protein film as claimed in claim 1, wherein said soybean protein is isolated or concentrated from defatted soybean powder, said solution or suspension further contains a wetting agent and is subjected to mechanical stirring to form said air bubbles therein, and said solution or suspension containing said air bubbles is applied onto a flat surface and dried by stretching.

4. The soybean protein film as claimed in claim 3, wherein said wetting agent is at least one member selected from the group consisting of sorbitol and glycerol.

5. The soybean protein film as claimed in claim 1, wherein said soybean protein is isolated from defatted soybean power and contains more than 90 weight % protein, or is concentrated from defatted soybean powder and contains more than 70 weight % protein.

* * * * *